(12) United States Patent
Ji et al.

(10) Patent No.: US 12,285,992 B2
(45) Date of Patent: Apr. 29, 2025

(54) TEMPERATURE CONTROL SYSTEM OF GOODS DELIVERY VEHICLE

(71) Applicants: HYUNDAI MOTOR COMPANY, Seoul (KR); KIA CORPORATION, Seoul (KR)

(72) Inventors: Byoung Hyun Ji, Goyang-si (KR); Seong Min An, Seoul (KR); Yoon Hyung Lee, Seongnam-si (KR); Sang Shin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 57 days.

(21) Appl. No.: 17/874,250

(22) Filed: Jul. 26, 2022

(65) Prior Publication Data
US 2023/0040836 A1 Feb. 9, 2023

(30) Foreign Application Priority Data

Aug. 4, 2021 (KR) ........................ 10-2021-0102276

(51) Int. Cl.
*B60H 1/00* (2006.01)
*B60P 3/00* (2006.01)
(Continued)

(52) U.S. Cl.
CPC ..... *B60H 1/00357* (2013.01); *B60H 1/00021* (2013.01); *B60H 1/00564* (2013.01);
(Continued)

(58) Field of Classification Search
None
See application file for complete search history.

(56) References Cited

U.S. PATENT DOCUMENTS 4,553,584 A * 11/1985 Bloomquist ............ F25D 17/06
165/263
6,113,483 A * 9/2000 Schambre .......... B60H 1/00842
454/121
(Continued)

FOREIGN PATENT DOCUMENTS

CA 2877620 A1 * 1/2014 ......... B60H 1/00014
KR 10-0815624 B1 3/2008
WO WO-2017210404 A1 * 12/2017 ......... B60H 1/00014

*Primary Examiner* — Jenna M Maroney
(74) *Attorney, Agent, or Firm* — Morgan, Lewis & Bockius LLP (57) ABSTRACT

A temperature control system of a vehicle of delivering goods includes a first loading compartment located in the vehicle, a second loading compartment located separately from the first loading compartment, a temperature regulation unit connected in fluid communication with the first loading compartment and the second loading compartment such that a fluid may flow therebetween, a first air discharge door located in the first loading compartment, a second air discharge door located in the second loading compartment, and a controller configured to control operation of the temperature regulation unit in response to setting of temperatures of the first loading compartment and the second loading compartment, and to control opening and closing of the first air discharge door and the second air discharge door.

13 Claims, 8 Drawing Sheets

(51) Int. Cl.
*B60P 3/20* (2006.01)
*G06Q 10/0832* (2023.01)

(52) U.S. Cl.
CPC ..... *B60H 1/00685* (2013.01); *B60H 1/00764* (2013.01); *B60H 1/00785* (2013.01); *B60P 3/007* (2013.01); *B60P 3/205* (2013.01); *G06Q 10/0832* (2013.01); *B60H 2001/00135* (2013.01); *B60H 2001/0015* (2013.01)

(56) References Cited

U.S. PATENT DOCUMENTS

| | | | |
|---|---|---|---|
| 7,451,614 B2 * | 11/2008 | Luehrs | F25D 23/065 62/441 |
| 2017/0282738 A1 * | 10/2017 | Miller | B60L 1/02 |
| 2019/0051090 A1 * | 2/2019 | Goldberg | G07F 9/001 |
| 2020/0039465 A1 * | 2/2020 | Ferguson | G06K 7/10722 |
| 2020/0086730 A1 | 3/2020 | Hara | |
| 2021/0170830 A1 * | 6/2021 | Sikorski | B60H 1/00835 |

* cited by examiner

TEMPERATURE CONTROL SYSTEM OF GOODS DELIVERY VEHICLE

CROSS-REFERENCE TO RELATED APPLICATION

This application claims under 35 U.S.C. § 119 (a) the benefit of priority to Korean Patent Application No. 10-2021-0102276 filed on Aug. 4, 2021 in the Korean Intellectual Property Office, the entire contents of which are incorporated herein by reference.

BACKGROUND

(a) Technical Field

The present disclosure relates to a temperature control system of a goods delivery vehicle. More particularly, it relates to a temperature control system of a goods delivery vehicle which may individually control the temperatures and humidities of loading compartments located independently of each other.

(b) Background Art

As online distribution increases and logistics is gradually widened and is performed throughout the world, interest of the distribution industry in quality maintenance of carrying goods during a distribution period is rising. Further, recent investigation found that the scale of the domestic fresh food market was 71.1 trillion won in the agricultural, fishery and livestock industries, 70.6 trillion won in the food manufacturing industry, and 186.3 trillion won in the wholesale and retail food distribution industry, and thus, the scale of the whole market of the domestic food industry was about 328 trillion. Therefore, creation of environments in which quality of fresh goods is maintained, such as maintenance of freshness of goods for a transportation period, implementation of low temperature distribution, etc., is emerging as an important issue.

Various object items to which fresh goods distribution is applied are food, daily necessities, chemicals, medicine, flowers, etc. When these items are exposed to an environment deviating from a designated temperature range over a designated time, loss, such as deterioration, decomposition, decrease or the like, occurs, and hygiene problems are caused, and thereby, in order to preserve initial quality and safety, constant temperature control and appropriate environment maintenance are required during a distribution period.

Conventionally, in order to manage the quality of fresh goods, a method in which an expiration date set by reflecting properties of an article is marked on products was mainly used, but in such a conventional method, an article, which may be easily decomposed, has high possibility that the quality of the article is changed depending on a distribution environment, and the expiration date of the article varies depending on a temperature condition as well as lapse of time and thus there is lack of accuracy in the expiration date of the article.

In distribution of such fresh goods, the temperature and humidity of the goods are measured based on a delivery unit, such as a container or the like, and remain constant so as to preserve the quality of the goods, but in this case, the temperature of the goods varies depending on a packaging unit, such as a box or the like, in the delivery unit or a position of each articles based on the position of a cooling apparatus, and thus, the quality of the goods in the delivery unit is not constant.

Therefore, a goods delivery vehicle including various types of loading compartments which are divided from each other is essentially required, and the respective loading compartments need to control the temperatures and humidities thereof independently of each other.

Moreover, a goods delivery vehicle using autonomous driving technology appears recently, and such a vehicle essentially requires control of a temperature regulation unit in consideration of the battery environment of the vehicle.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to control the temperatures and humidities of a plurality of loading compartments through a temperature control system of a goods delivery vehicle.

It is another object of the present disclosure to provide air having a controlled temperature to a plurality of loading compartments connected to each other such that a fluid may flow therebetween through one temperature regulation unit.

In one exemplary embodiment, the present disclosure provides a temperature control system of a vehicle of delivering goods, which includes a first loading compartment located in the vehicle, a second loading compartment located separately from the first loading compartment, a temperature regulation unit connected in fluid communication with the first loading compartment and the second loading compartment such that a fluid may flow therebetween, a first air discharge door located in the first loading compartment, a second air discharge door located in the second loading compartment, and a controller configured to control operation of the temperature regulation unit in response to setting of temperatures of the first loading compartment and the second loading compartment, and to control opening and closing of the first air discharge door and the second air discharge door.

In an exemplary embodiment, the temperature control system may further include a duct configured to connect the temperature regulation unit selectively or simultaneously to the first loading compartment and the second loading compartment, and an air volume distribution door located in the duct, and the controller may selectively open or close the air volume distribution door so that air flows into the first loading compartment and the second loading compartment.

In an exemplary embodiment, the temperature control system may further include sensor units respectively located in the first loading compartment and the second loading compartment.

In an exemplary embodiment, each of the sensor units respectively located in the first loading compartment and the second loading compartment may include a humidity sensor and a temperature sensor, and the controller may control operation of the temperature regulation unit based on humidity and temperature information received from the humidity sensor and the temperature sensor of each of the sensor units.

In an exemplary embodiment, the temperature regulation unit may include a blower configured to enable cooled air to flow into the duct, and an evaporator configured to cool the air flowing into the duct.

In an exemplary embodiment, the controller may be configured to change a temperature of the first loading compartment or the second loading compartment so as to switch to a freezing mode, a refrigerating mode or a room temperature mode in response to a user request.

In an exemplary embodiment, in the freezing mode, the controller may switch the first air discharge door of the first loading compartment or the second air discharge door of the second loading compartment to a closed state, and may set operating force of the temperature regulation unit to be higher than operating force of the temperature regulation unit in the refrigerating mode.

In an exemplary embodiment, in the refrigerating mode, the controller may open the first air discharge door of the first loading compartment or the second air discharge door of the second loading compartment, and may operate the temperature regulation unit.

In an exemplary embodiment, in the room temperature mode, the controller may open the first air discharge door of the first loading compartment or the second air discharge door of the second loading compartment, and may operate the temperature regulation unit.

In an exemplary embodiment, the controller may determine a distance to empty of the vehicle, and may reduce operating force of the temperature regulation unit when the distance to empty of the vehicle is equal to or less than a first reference value.

In an exemplary embodiment, the air volume distribution door may include a rotating guide located in the duct, a first discharge part disposed in the rotating guide and located at a position corresponding to the first loading compartment, a second discharge part disposed in the rotating guide and located at a position corresponding to the second loading compartment, and a central discharge part disposed in the rotating guide and located between the first discharge part and the second discharge part.

In an exemplary embodiment, the controller may rotate the rotating guide such that the central discharge part faces the first loading compartment or the second loading compartment, so as to enable air discharged from the temperature regulation unit to flow into the first loading compartment or the second loading compartment facing the central discharge part.

Other aspects and exemplary embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims. The embodiments are provided to make the description of the present disclosure thorough and to fully convey the scope of the present disclosure to those skilled in the art.

In the following description of the embodiments, it will be understood that the suffixes "unit", "part", "compartment" and the like indicate units for processing at least one function or operation, and may be implemented using hardware, software or various combinations of hardware and software.

Further, in the following description of the embodiments, terms, such as "first" and "second", are used only to distinguish one element from other elements, and these terms should not be construed as being limiting with regard to the sequence thereof.

Hereinafter, reference will be made in detail to various embodiments of the present disclosure, examples of which are illustrated in the accompanying drawings and described below. In the drawings, the same or similar elements are denoted by the same reference numerals even though they are depicted in different drawings, and a detailed description thereof will be omitted when it may make the subject matter of the present disclosure rather unclear.

The present disclosure relates to a temperature control system 10 of a goods delivery vehicle, and more particularly, to technology which controls the temperatures and humidities of a plurality of loading compartments 100 and 200 of a goods delivery vehicle corresponding to an electric vehicle or an autonomous vehicle.

Figure 1:
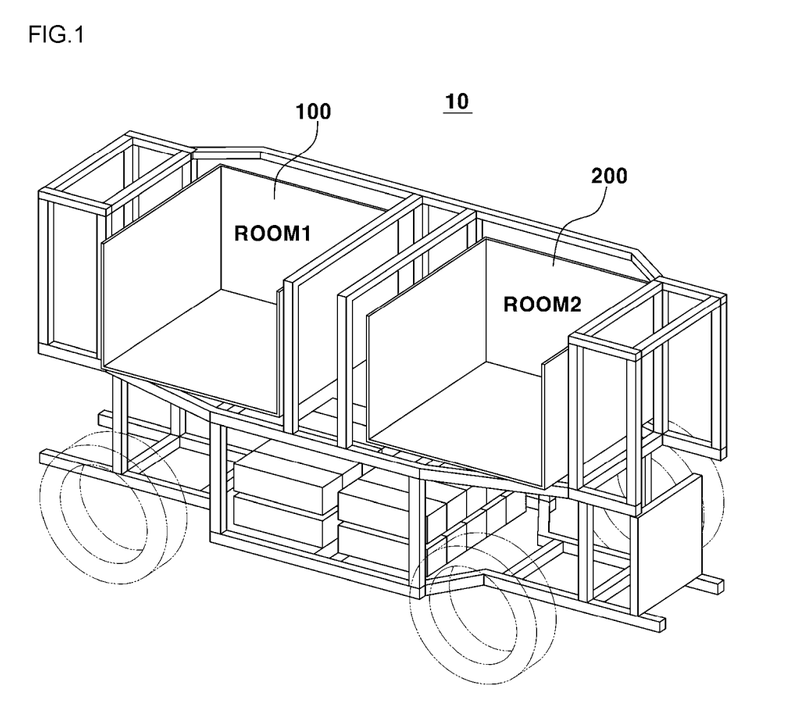
FIG. 1 is a perspective view of a goods delivery vehicle according to one embodiment of the present disclosure.

FIG. 1 is a perspective view of a goods delivery vehicle according to one embodiment of the present disclosure.

The goods delivery vehicle according to the present disclosure may include two loading compartments 100 and 200, and the first loading compartment 100 and the second loading compartment 200 may be configured independently. The first loading compartment 100 and the second loading compartment 200 may be separated from each other by a fake wall within one housing, and heat transfer between the first loading compartment 100 and the second loading compartment 200 may be blocked.

The goods delivery vehicle according to the present disclosure may further include a temperature regulation unit 300 connected to the first loading compartment 100 and the second loading compartment 200 such that a fluid may flow therebetween. The temperature regulation unit 300 may be configured to inject air into the first loading compartment 100 and the second loading compartment 200 through a duct 600, and an air volume distribution door 500 located in the duct 600 may control the amounts of air injected into the first loading compartment 100 and the second loading compartment 200.

According to another embodiment of the present disclosure, the temperature regulation unit 300 may be located so as to face the loading compartments 100 and 200.

Further, the goods delivery vehicle according to the present disclosure further includes a first air discharge door 110 located inside the first loading compartment 100 and configured to connect the space of the first loading compartment 100 to the outside such that the fluid may flow therebetween, and a second air discharge door 210 located inside the second loading compartment 200 and configured to connect the space of the second loading compartment 200 to the outside such that the fluid may flow therebetween.

The temperature regulation unit 300 is configured to raise or lower the temperature of air flowing thereinto from the outside of the vehicle. The temperature regulation unit 300 may include an air conditioning system located in the vehicle. Further, the temperature regulation unit 300 includes an inlet (not shown) configured to draw in air from the outside of the vehicle, an evaporator 320 configured to lower the temperature of the air drawn in through the inlet, and a blower 310 configured to blow the air having passed through the evaporator 320 towards the loading compartments 100 and 200.

The temperature of the air drawn in by operating the evaporator 320 is controlled by a controller 400, and the controller 400 is configured to control the temperature of the air discharged from the evaporator 320 and the operating amount of the blower 310 depending on modes of the respective loading compartments 100 and 200 set in response to a user request.

Electric power is applied to the evaporator 320 and the blower 310 through a battery module 800 located in the vehicle, and the battery module 800 may simultaneously drive the goods delivery vehicle and control operation of the temperature regulation unit 300.

The controller 400 is configured to control the temperature regulation unit 300, the air volume distribution door 500, the first air discharge door 110 and the second air discharge door 210, and to receive temperature and humidity information of the loading compartments 100 and 200 from corresponding sensor units 700 located in the respective loading compartments 100 and 200. More particularly, the controller 400 may be configured to control at least one of the temperature regulation unit 300, the air volume distribution door 500, the first air discharge door 110 and the second air discharge door 210 based on information received from humidity sensors 720 and temperature sensors 710 located in the respective loading compartments 100 and 200.

Moreover, the controller 400 is configured to receive a mode set value input by a user and to control the temperature regulation unit 300 depending on a corresponding mode. That is, the controller 400 is configured to determine the temperature of the air discharged from the evaporator 320 and to determine the operating amount of the blower 310 depending on the mode set by the user.

In one embodiment of the present disclosure, when at least one of the loading compartments 100 and 200 is set in a freezing mode, the controller 400 may switch the air discharge door 110 or 210 of the corresponding loading compartment 100 or 200 to a closed state, may lower the temperature of air discharged from the evaporator 320, and may set the operating force of the blower 310 to be higher than that in a refrigerating mode or a room temperature mode.

Further, when the loading compartments 100 and 200 are set in the refrigerating mode, the controller 400 may switch the air discharge doors 110 and 210 to the open state, may raise the temperature of air discharged from the evaporator 320 compared to in the freezing mode, and may set the operating force of the blower 310 to be lower than that in the freezing mode.

On the other hand, when the loading compartments 100 and 200 are set in the room temperature mode, the controller 400 may set the temperature of air flowing from the temperature regulation unit 300 to the same temperature as an external temperature (or a reference room temperature stored in the controller 400), and may maintain the minimum driving state or the stopped state of the blower 310.

Further, the controller 400 may be configured to receive the state of charge (SOC) of the battery module 800 of the vehicle, and to calculate the distance to empty of the vehicle based on the received SOC of the battery module 800. In addition, the controller 400 is configured to reduce electric power applied to the evaporator 320 and the blower 310 of the temperature regulation unit 300 when the distance to empty of the vehicle is less than a driving distance (a first reference value) required by the vehicle, which is output by a navigation system. Otherwise, the controller 400 is configured to reduce electric power applied to the evaporator 320 and the blower 310 of the temperature regulation unit 300 when the distance to empty of the vehicle, which is calculated based on the SOC of the battery module 800, is equal to or less than the predetermined first reference value.

That is, the controller 400 is configured to set electric power applied to the temperature regulation unit 300 in the freezing mode and in the refrigerating mode, to compare the distance to empty of the vehicle with a distance which the vehicle needs to actually drive, and to reduce the electric power applied to the temperature regulation unit 300 in the freezing mode and in the refrigerating mode when the distance which the vehicle needs to actually drive is greater than the distance to empty of the vehicle.

The distance to empty of the vehicle may be calculated based on the SOC of the battery module 800, and the distance to empty of the vehicle may be determined using the first reference value based on a distance currently input to the navigation system.

Further, the temperature regulation unit 300 may include a battery module 800 provided independently of the battery module 800 configured to drive the vehicle, and the battery module 800 configured to drive the vehicle and the battery module 800 configured to drive the temperature regulation unit 300 may be connected so as to mutually transmit electric power to each other.

Figure 2:
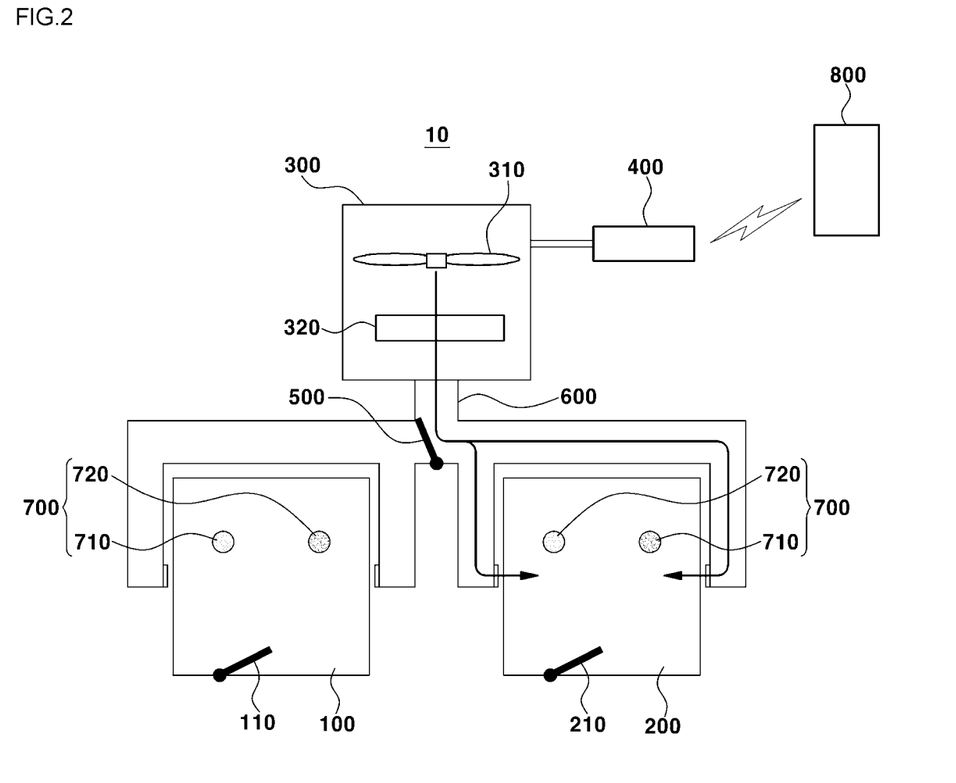
FIG. 2 is a view illustrating an independent control mode of loading compartments of a temperature control system of the goods delivery vehicle according to one embodiment of the present disclosure.

FIG. 2 illustrates a temperature control system 10 of the goods delivery vehicle according to one embodiment of the present disclosure, in the state in which the second loading compartment 200 is independently controlled.

As shown in this figure, the first loading compartment 100 and the second loading compartment 200 are connected to the temperature regulation unit 300 such that the fluid may flow therebetween, and the temperature of the second loading compartment 200 is controlled.

As shown in FIG. 2, in order to control the temperature of the second loading compartment 200, the controller 400 may control the air volume distribution door 500 to be open towards the second loading compartment 200, and may operate the temperature regulation unit 300 in response to a mode input by a user.

The controller 400 measures the temperature and humidity of the inside of the second loading compartment 200 through the sensor unit 700 located in the second loading compartment 200, and performs feedback control of the temperature regulation unit 300 based on the measured temperature and humidity.

Figure 3:
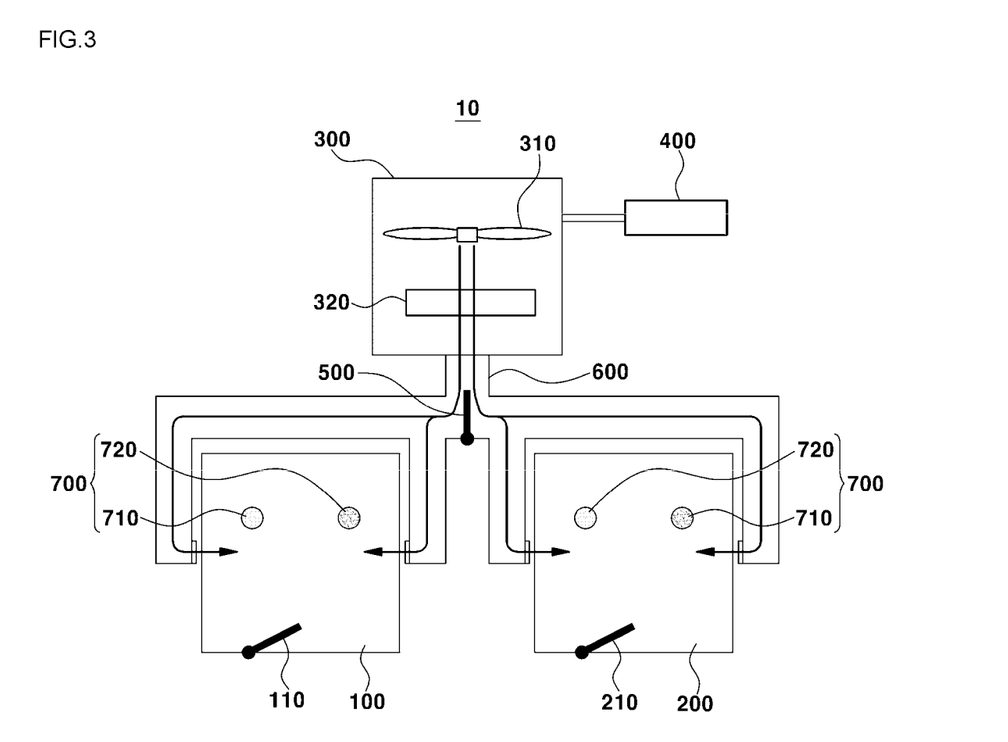
FIG. 3 is a view illustrating an integrated control mode of the loading compartments of the temperature control system of the goods delivery vehicle according to one embodiment of the present disclosure.

On the other hand, FIG. 3 illustrates the temperature control system 10 of the goods delivery vehicle according to one embodiment of the present disclosure, in the state in which the first loading compartment 100 and the second loading compartment 200 are integrally controlled.

As shown in this figure, the air volume distribution door 500 inside the duct 600 is controlled to be open towards both the first loading compartment 100 and the second loading compartment 200, thereby enabling air supplied from the temperature regulation unit 300 to flow into both the first loading compartment 100 and the second loading compartment 200.

The temperature and flow rate of air, which is discharged from the temperature regulation unit 300 and then flows into the respective loading compartments 100 and 200, are determined depending on a mode applied to the controller 400, and the controller 400 is configured to set the temperature of air discharged from the blower 310 and the evaporator 320 depending on the mode.

Moreover, the controller 400 is configured to control opening and closing of the first air discharge door 110 and the second air discharge door 210, and more particularly, is configured to control opening and closing of the first air discharge door 110 and the second air discharge door 210 in response to the freezing mode, the refrigerating mode or the room temperature mode input by the user.

Figure 4:
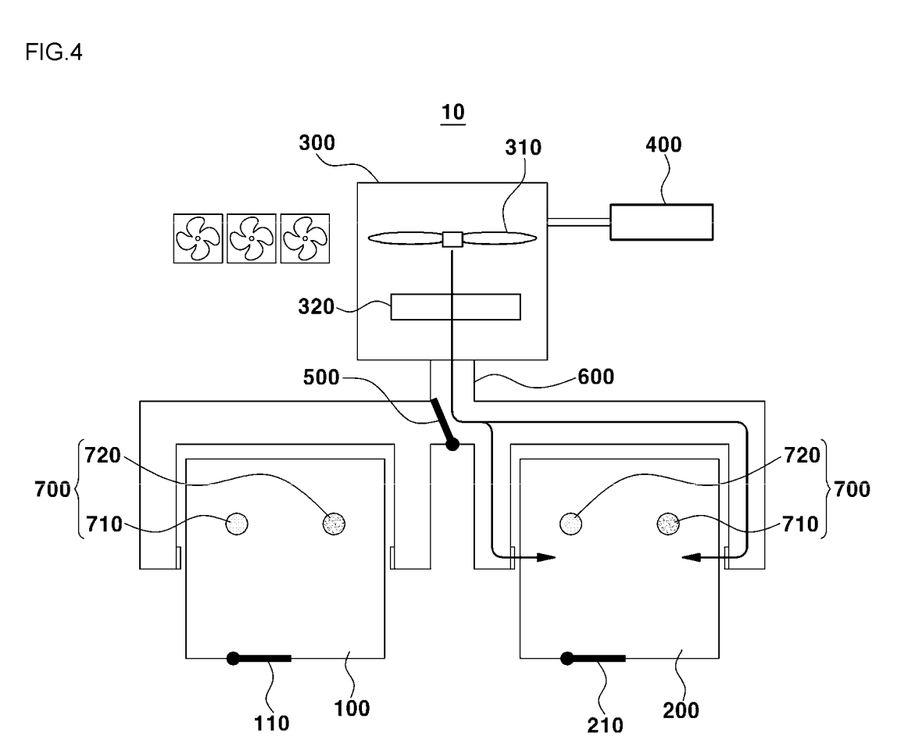
FIG. 4 is a view illustrating the loading compartments of the temperature control system of the goods delivery vehicle according to one embodiment of the present disclosure in a freezing mode.
Figure 5:
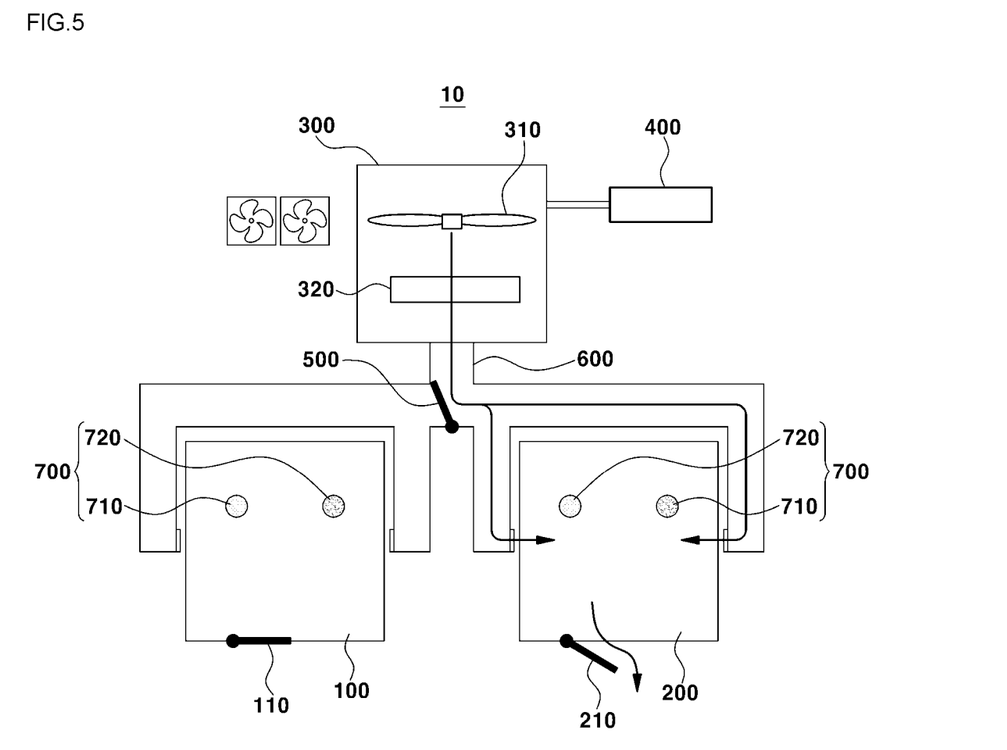
FIG. 5 is a view illustrating the loading compartments of the temperature control system of the goods delivery vehicle according to one embodiment of the present disclosure in a refrigerating mode.
Figure 6:
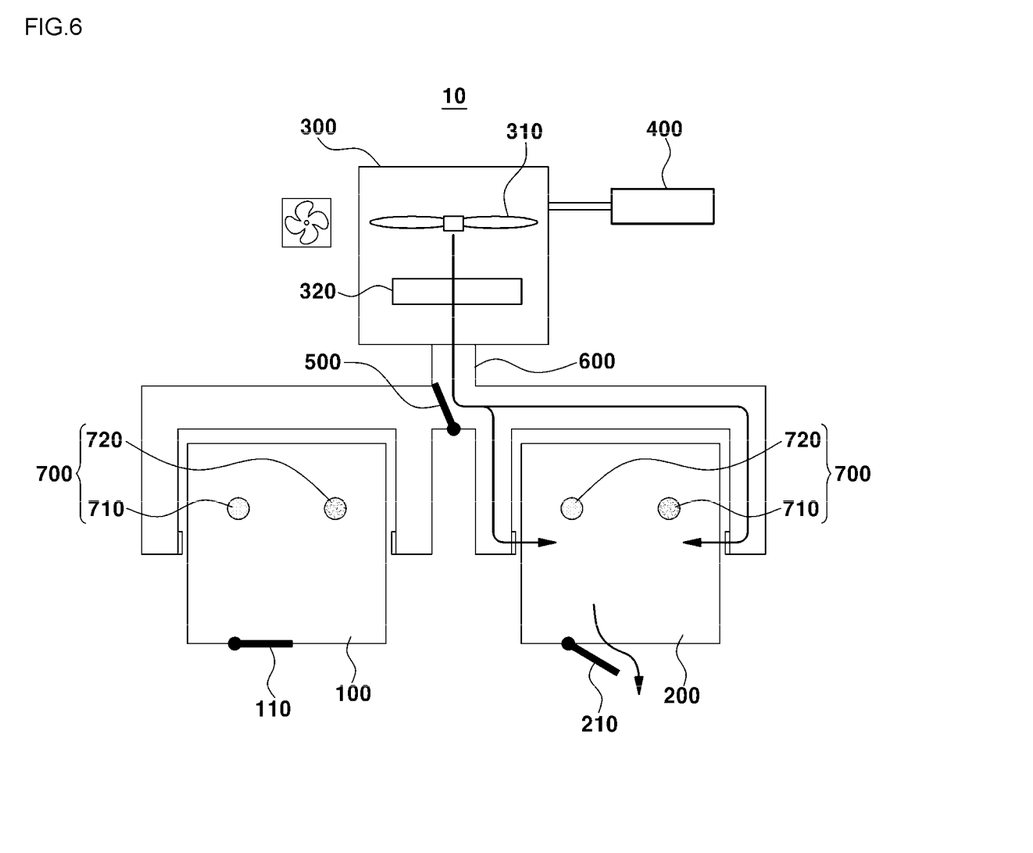
FIG. 6 is a view illustrating the loading compartments of the temperature control system of the goods delivery vehicle according to one embodiment of the present disclosure in a room temperature mode.

Hereinafter, FIGS. 4 to 6 illustrate the configuration of the second loading compartment 200 according to one embodiment of the present disclosure in the freezing mode, the refrigerating mode and the room temperature mode.

FIG. 4 illustrates connection relations among elements of the temperature control system 10 of the goods delivery vehicle according to one embodiment of the present disclosure, when the second loading compartment 200 is in the freezing mode.

The controller 400 receives a request for switching of the second loading compartment 200 to the freezing mode in response to a user request, and controls the air volume distribution door 500 so as to allow air discharged from the temperature regulation unit 300 to flow into the second loading compartment 200 in response to the received request.

Further, the controller 400 increases the operating amount of the evaporator 320 so as to lower the temperature of air discharged from the temperature regulation unit 300, and increases the rotational speed of the blower 310 so as to increase the amount of air flowing into the second loading compartment 200.

In addition, the controller 400 switches the second air discharge door 210 to the closed state so as to seal the second loading compartment 200. Therefore, air having a low temperature flows into the second loading compartment 200.

In one embodiment of the present disclosure, in the freezing mode, the operating speed of an air conditioner for operating the evaporator 320 may controlled to be 8,000 to 9,000 RPM, and the amount of air applied by the blower 310 may be controlled to reach the maximum.

That is, in the freezing mode, in order to lower the temperature of a corresponding loading compartment 100 or 200, the controller 400 increases operation of the evaporator 320 so as to increase the operating speed of the air conditioner and controls the blower 310 so as to increase the amount of air, and that is, controls the temperature regulation unit 300 to have a higher operating amount than the operating amount in the refrigerating mode and the room temperature mode.

FIG. 5 illustrates the operating state of the temperature regulation unit 300 according to one embodiment of the present disclosure, when the second loading compartment 200 is in the refrigerating mode.

As shown in this figure, in the refrigerating mode, the air volume distribution door 500 is located to connect the temperature regulation unit 300 and the second loading compartment 200 to each other such that the fluid may flow therebetween, and the second air discharge door 210 remains open. Further, the operating amount of the temperature regulation unit 300 in the refrigerating mode is set to be lower than the operating amount of the temperature regulation unit 300 in the freezing mode.

More particularly, in the refrigerating mode, the temperature of air discharged from the evaporator 320 is set to be higher than the temperature of air in the freezing mode, and the amount of air flowing into the second loading compartment 200 through the duct 600 is set to be less than the amount of air in the freezing mode.

In one embodiment of the present disclosure, in the refrigerating mode, the operating speed of the air conditioner for operating the evaporator 320 may controlled to be 2,000 to 3,000 RPM, and the amount of air applied by the blower 310 may be controlled to reach 30% to 50% of the volume of air applied by the blower 310 in the freezing mode.

Further, the second air discharge door 210 remains open so that air discharged from the temperature regulation unit 300 and flowing into the second loading compartment 200 is discharged to the outside.

FIG. 6 illustrates the operating state of the temperature regulation unit 300 according to one embodiment of the present disclosure, when the second loading compartment 200 is in the room temperature mode.

When the room temperature mode of the second loading compartment 200 is input to the controller 400, the controller 400 switches the evaporator 300 to a minimum operating state or an off state, and also switches the blower 310 to the minimum operating state or the off state. Further, the controller 400 opens the second air discharge door 210, and thus, the second loading compartment 200 maintains temperature and humidity similar to those of air of room temperature.

In this way, the controller 400 may be configured to individually control the respective loading compartments 100 and 200 in the freezing mode, the refrigerating mode and the room temperature mode in response to a user request. Otherwise, the controller 400 may be configured to integrally control the first loading compartment 100 and the second loading compartment 200. The controller 400 may control the temperatures and humidities of the first loading compartment 100 and the second loading compartment 200 by adjusting the opening degree of the air volume distribution door 500.

Figure 7:
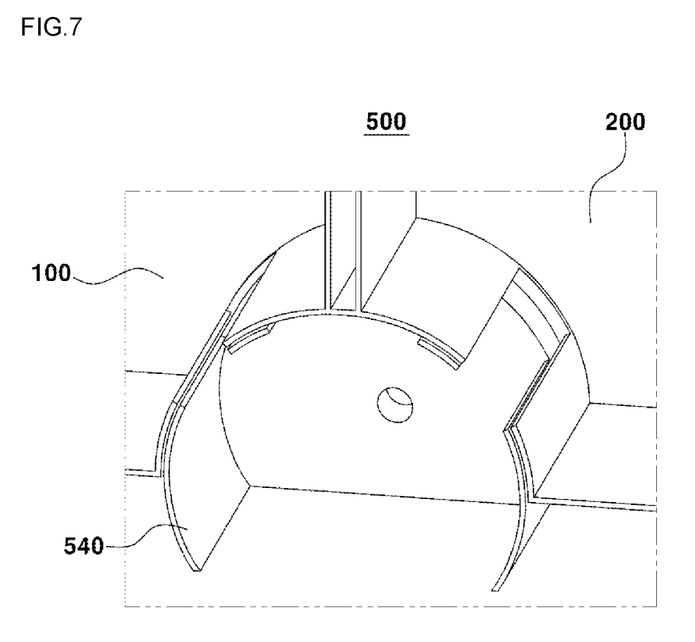
FIG. 7 is a perspective view illustrating an air volume distribution door of the temperature control system of the goods delivery vehicle according to one embodiment of the present disclosure.

FIG. 7 illustrates the configuration of the air volume distribution door 500 configured to connect the temperature regulation unit 300 to the first and second loading compartments 100 and 200, respectively.

As shown in this figure, the temperature regulation unit 300 and the first and second loading compartments 100 and 200 are connected to each other such that the fluid may flow therebetween, and the air volume distribution door 500 is rotatably provided at a position where the temperature regulation unit 300 and the first and second loading compartments 100 and 200 are adjacent to each other.

In one embodiment of the present disclosure, as shown in this figure, the temperature regulation unit 300 and the first and second loading compartments 100 and 200 are provided so as to be adjacent to each other about the air volume distribution door 500. In another embodiment of the present disclosure, the temperature regulation unit 300 and the first and second loading compartments 100 and 200 may be combined with each other through the duct 600, and the air volume distribution door 500 may be provided inside the duct 600 so as to be located between the first loading compartment 100 and the second loading compartment 200.

The air volume distribution door 500 includes a rotating guide 540 configured to be rotatable, and a first discharge part 510 and a second discharge part 520 configured to integrally control the first loading compartment 100 and the second loading compartment 200 are disposed in the rotating guide 540 so as to respectively face the first loading compartment 100 and the second loading compartment 200.

A central discharge part 530 may be disposed in the rotating guide 540 between the first discharge part 510 and the second discharge part 520. When an individual control mode of the first loading compartment 100 or the second loading compartment 200 is set, the rotating guide 540 is rotated so that the central discharge part 530 is located at a position facing the loading compartment 100 or 200 corresponding to the selected individual control mode.

The first discharge part 510 may be configured to have a wider opening than an inlet of the first loading compartment 100, and the second discharge part 520 may be configured to have a wider opening than an inlet of the second loading compartment 200. Further, the central discharge part 530 may be configured to have a wider width than the openings of the first discharge part 510 and the second discharge part 520.

Therefore, the flow rate of air flowing into the first loading compartment 100 through the first discharge part 510 and the flow rate of air flowing into the second loading compartment 200 through the second discharge part 520 may be respectively controlled in response to rotation of the rotating guide 540.

For example, the second discharge part 520 may partially open the inlet of the second loading compartment 200 in the state in which the first discharge part 510 completely opens the inlet of the first loading compartment 100, and on the other hand, the first discharge part 510 may partially open the inlet of the first loading compartment 100 in the state in which the second discharge part 520 completely opens the inlet of the second loading compartment 200. Further, the first discharge part 510 and the second discharge part 520 may simultaneously completely open the inlets of the corresponding loading compartments 100 and 200.

Further, in the state in which the central discharge part 530 corresponds to the inlet of the first loading compartment 100, the first discharge part 510 and the second discharge part 520 are switched to the closed state, and in the state in which the central discharge part 530 corresponds to the inlet of the second loading compartment 200, the first discharge part 510 and the second discharge part 520 are also switched to the closed state. That is, the central discharge part 530 may be controlled to selectively connect the temperature regulation unit 300 to the respective loading compartments 100 and 200 such that the fluid may flow therebetween.

The rotating guide 540 may be configured to be rotatable about the duct 600 or a vehicle body, and may selectively connect the temperature regulation unit 300 to the loading compartments 100 and 200 into which air discharged from the temperature regulation unit 300 flows. More particularly, a drive unit combined with the rotating guide 540 may be rotated by the controller 400. Therefore, the controller 400 rotates the rotating guide 540 so as to connect the temperature regulation unit 300 to at least one of the loading compartments 100 and 200, selected in response to user selection.

Figure 8A:
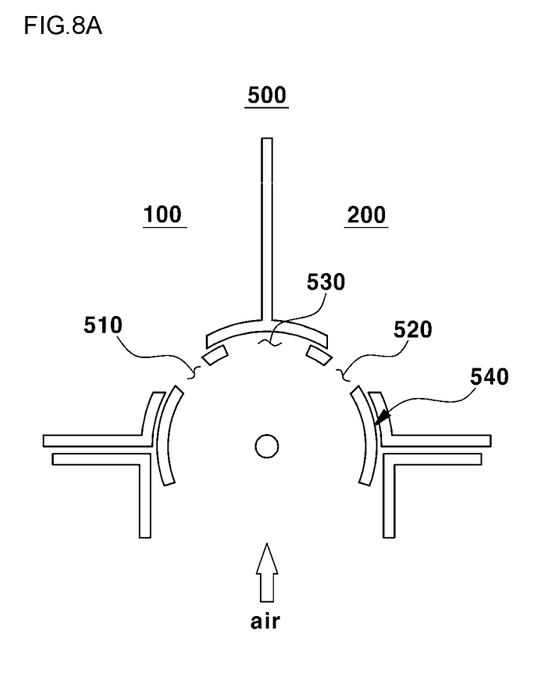
FIG. 8A is a cross-sectional view illustrating the air volume distribution door located to be connected to two loading compartments according to the present disclosure such that a fluid may flow therebetween.

FIG. 8A is a cross-sectional view of the air volume distribution door 500 operated to perform integrated control of the first loading compartment 100 and the second loading compartment 200 according to one embodiment of the present disclosure.

In order to simultaneously control the temperatures and humidities of the first loading compartment 100 and the second loading compartment 200, the controller 400 controls the rotating guide 540 so that both the first discharge part 510 facing the first loading compartment 100 and the second discharge part 520 facing the second loading compartment 200 are open.

Through such a rotating guide 540, air discharged from the temperature regulation unit 300 flows into both the first loading compartment 100 and the second loading compartment 200. Further, because the opening degrees of the first discharge part 510 and the second discharge part 520 are controlled by the rotating amount of the rotating guide 540, the flow rates and amounts of air flowing into the first loading compartment 100 and the second loading compartment 200 may be controlled.

Figure 8B:
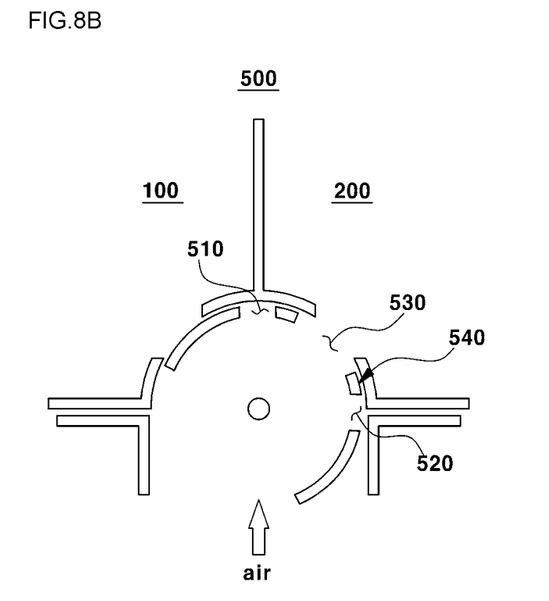
FIG. 8B is a cross-sectional view illustrating the air volume distribution door located to be connected to the second loading compartment according to the present disclosure such that the fluid may flow therebetween.

In comparison, FIG. 8B is a cross-sectional view illustrating the air volume distribution door 500 operated to connect the temperature regulation unit 300 to the second loading compartment 200 such that the fluid may flow therebetween.

As shown in this figure, the rotating guide 540 is rotated so that the central discharge part 530 is connected to the second loading compartment 200, and the first discharge part 510 and the second discharge part 520 are closed. Therefore, air discharged from the temperature regulation unit 300 flows into the second loading compartment 200 through the central discharge part 530.

That is, in this figure, the first loading compartment 100 may enter the room temperature mode, and the second loading compartment 200 may enter the freezing mode or the refrigerating mode.

Figure 8C:
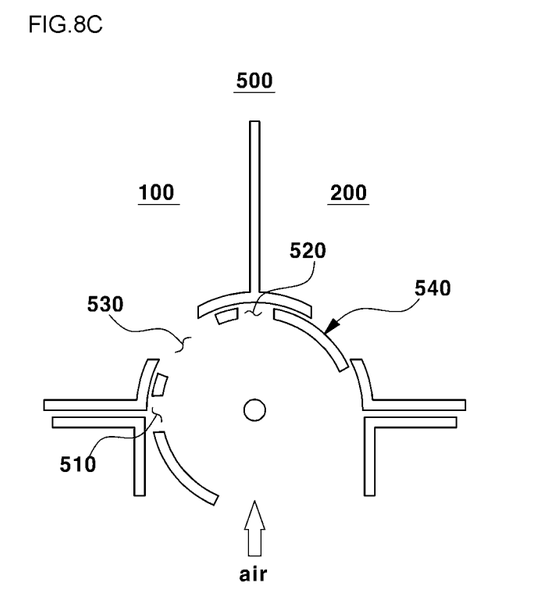
FIG. 8C is a cross-sectional view illustrating the air volume distribution door located to be connected to the first loading compartment according to the present disclosure such that the fluid may flow therebetween.

Further, FIG. 8C is a cross-sectional view illustrating the air volume distribution door 500 in the state in which the central discharge part 530 is connected to the first loading compartment 100 such that the fluid may flow therebetween.

The rotating guide 540 is rotated so that the central discharge part 530 is located at a position facing the inlet of the first loading compartment 100, and the first discharge part 510 and the second discharge part 520 are closed. The controller 400 may be configured to rotate the rotating guide 540 so that the central discharge part 530 is connected to the first loading compartment 100 in response to the freezing mode or the refrigerating mode of the first loading compartment 100, and to switch the second loading compartment 200 to the room temperature mode or the off state.

As described above, the controller 400 may rotate the rotating guide 540 so that the central discharge part 530 faces the inlet of the first loading compartment 100 or the inlet of the second loading compartment 200, and thereby, air discharged from the temperature regulation unit 300 may selectively flow into the corresponding loading compartment 100 or 200.

As is apparent from the above description, the present disclosure provides the following effects through the above-described configuration and connection and usage relations.

A temperature control system of a goods delivery vehicle according to the present disclosure may control the temperatures and humidities of a plurality of loading compartments through one temperature regulation unit, thereby being capable of achieving configuration simplification.

Further, the temperature control system according to the present disclosure may control operation of the temperature regulation unit in consideration of the distance to empty of the vehicle, thereby being capable of improving durability of a vehicle battery.

The present disclosure has been described in detail with reference to various embodiments thereof. However, it will be appreciated by those skilled in the art that changes may be made in these embodiments without departing from the principles and spirit of the disclosure, the scope of which is defined in the appended claims and their equivalents. That is, while the present disclosure has been explained in relation to embodiments thereof, it is to be understood that various modifications thereof will become apparent to those skilled in the art upon reading the specification. These embodiments have been described to explain the best mode to implement the technical scope of the disclosure, and various modifications required in the specific application and purpose of the present disclosure are possible. Therefore, the above detailed description of the present disclosure is not intended to limit the disclosure. Further, it must be interpreted that the accompanying claims encompass other modes.

What is claimed is:

1. A temperature control system of a vehicle of delivering goods, the temperature control system comprising:
   a first loading compartment located in the vehicle;
   a second loading compartment located separately from the first loading compartment;
   a temperature regulation unit connected in fluid communication with the first loading compartment and the second loading compartment;
   a first air discharge door located in the first loading compartment;
   a second air discharge door located in the second loading compartment; and
   a controller configured to control operation of the temperature regulation unit in response to setting of temperatures of the first loading compartment and the second loading compartment, and to control opening and closing of the first air discharge door and the second air discharge door,
   wherein the controller is configured to calculate a distance to empty of the vehicle based on SOC information of a battery module of the vehicle and to control electric power applied to the temperature regulation unit based on the calculated distance to empty of the vehicle, and
   wherein the controller is further configured to:
   receive a user request for selecting a first temperature mode or a second temperature mode for at least one of the first loading compartment or the second loading compartment, and
   control opening and closing of a corresponding one of the first air discharge door and the second air discharge door in response to the user request for selecting the first temperature mode or the second temperature mode for the at least one of the first loading compartment or the second loading compartment.

2. The temperature control system of claim 1, further comprising sensor units respectively located in the first loading compartment and the second loading compartment.

3. The temperature control system of claim 2, wherein each of the sensor units respectively located in the first loading compartment and the second loading compartment comprises:
   a humidity sensor; and
   a temperature sensor,
   wherein the controller controls operation of the temperature regulation unit based on humidity and temperature information received from the humidity sensor and the temperature sensor of each of the sensor units.

4. The temperature control system of claim 1, wherein the temperature regulation unit comprises:
   a blower configured to enable cooled air to flow into the duct; and
   an evaporator configured to cool the air flowing into the duct.

5. The temperature control system of claim 1, wherein the controller is configured to change a temperature of the first loading compartment or the second loading compartment so as to switch to a freezing mode, a refrigerating mode or a room temperature mode in response to a user request.

6. The temperature control system of claim 5, wherein, in the freezing mode, the controller switches the first air discharge door of the first loading compartment and the second air discharge door of the second loading compartment to a closed state, and sets operating force of the temperature regulation unit to be higher than operating force of the temperature regulation unit in the refrigerating mode.

7. The temperature control system of claim 5, wherein, in the refrigerating mode, the controller opens the first air discharge door of the first loading compartment or the second air discharge door of the second loading compartment, and operates the temperature regulation unit.

8. The temperature control system of claim 5, wherein, in the room temperature mode, the controller opens the first air discharge door of the first loading compartment or the second air discharge door of the second loading compartment, and operates the temperature regulation unit.

9. The temperature control system of claim 1, wherein the controller determines the distance to empty of the vehicle, and reduces operating force of the temperature regulation unit when the distance to empty of the vehicle is equal to or less than a first reference value.

10. The temperature control system of claim 1, wherein the controller is further configured to supply a cooled air from the temperature regulation unit to the first loading compartment or the second loading compartment and to open the first air discharge door or the second air discharge door, such that a relatively higher temperature air flows into the first loading compartment or the second loading compartment through the first air discharge door or the second air discharge door.

11. The temperature control system of claim 1, further comprising:

a duct configured to connect the temperature regulation unit selectively or simultaneously to the first loading compartment and the second loading compartment; and an air volume distribution door located in the duct, wherein the controller is further configured to selectively open or close the air volume distribution door so that air flows into the first loading compartment and the second loading compartment.

12. The temperature control system of claim 11, wherein the air volume distribution door comprises:

a rotating guide located in the duct;

a first discharge part disposed in the rotating guide and located at a position corresponding to the first loading compartment;

a second discharge part disposed in the rotating guide and located at a position corresponding to the second loading compartment; and a central discharge part disposed in the rotating guide and located between the first discharge part and the second discharge part.

13. The temperature control system of claim 12, wherein the controller rotates the rotating guide such that the central discharge part faces the first loading compartment or the second loading compartment, so as to enable air discharged from the temperature regulation unit to flow into the first loading compartment or the second loading compartment facing the central discharge part.

* * * * *